(12) United States Patent
Rainer

(10) Patent No.: US 9,266,749 B1
(45) Date of Patent: *Feb. 23, 2016

(54) ASSEMBLY FOR TREATING FLOWING WATER

(71) Applicant: Norman B. Rainer, Richard, VA (US)

(72) Inventor: Norman B. Rainer, Richard, VA (US)

(*) Notice: Subject to any disclaimer, the term of this patent is extended or adjusted under 35 U.S.C. 154(b) by 209 days.

This patent is subject to a terminal disclaimer.

(21) Appl. No.: 13/987,796

(22) Filed: Sep. 4, 2013

(51) Int. Cl.
| | |
|---|---|
| C02F 1/28 | (2006.01) |
| C02F 101/20 | (2006.01) |
| C02F 103/00 | (2006.01) |
| B01D 27/06 | (2006.01) |
| B01D 15/00 | (2006.01) |
| B01D 39/16 | (2006.01) |

(52) U.S. Cl.
CPC ............ C02F 1/288 (2013.01); *B01D 15/00* (2013.01); *B01D 27/06* (2013.01); *B01D 39/163* (2013.01); *B01D 2201/0407* (2013.01); *B01D 2201/605* (2013.01); *C02F 1/285* (2013.01); *C02F 2101/20* (2013.01); *C02F 2103/001* (2013.01); *C02F 2201/006* (2013.01)

(58) Field of Classification Search
CPC ...... C02F 1/285; C02F 1/288; C02F 2101/20; C02F 2103/001; C02F 2201/006; B01D 15/00; B01D 27/06; B01D 39/163; B01D 2201/0407; B01D 2201/605
USPC ......... 210/484, 489, 496, 502.1, 505, 170.03, 210/350–352, 485, 493.3
See application file for complete search history.

(56) References Cited

U.S. PATENT DOCUMENTS

| | | | | |
|---|---|---|---|---|
| 3,064,820 | A * | 11/1962 | Gillick, Jr Thomas J et al. | 210/488 |
| 3,793,692 | A * | 2/1974 | Tate et al. | 29/896.62 |
| 5,468,536 | A * | 11/1995 | Whitcomb et al. | 428/98 |
| 7,381,333 | B1 * | 6/2008 | Rainer | 210/660 |
| 7,501,380 | B1 * | 3/2009 | Rainer | 502/401 |
| 8,263,229 | B1 * | 9/2012 | Rainer | 428/435 |
| 2009/0039028 | A1 * | 2/2009 | Eaton et al. | 210/679 |
| 2009/0078628 | A1 * | 3/2009 | Stetson | 210/167.1 |
| 2011/0024357 | A1 * | 2/2011 | De Vocht | 210/691 |
| 2011/0309036 | A1 * | 12/2011 | Hussam et al. | 210/767 |

* cited by examiner

Primary Examiner — Matthew O Savage
(74) Attorney, Agent, or Firm — Norman B. Rainer

(57) ABSTRACT

An assembly for the rapid removal of trace levels of ionic species from fast-moving flows of water employs a compressed stack of layers of batting containing ion-absorbing granules, and a confining cage for holding the stack in a rectangular configuration.

11 Claims, 2 Drawing Sheets

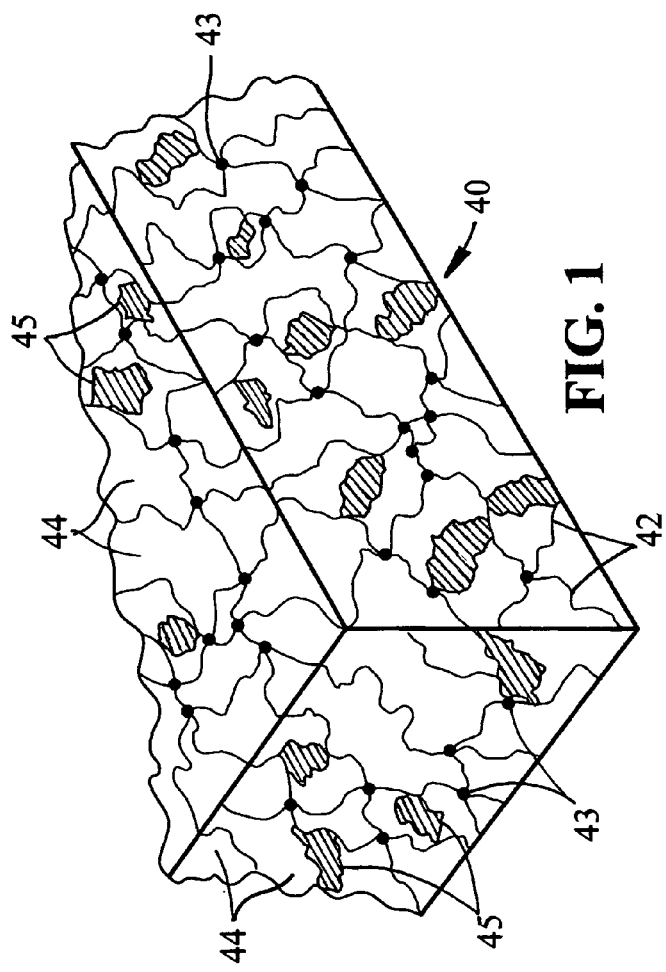
FIG. 1
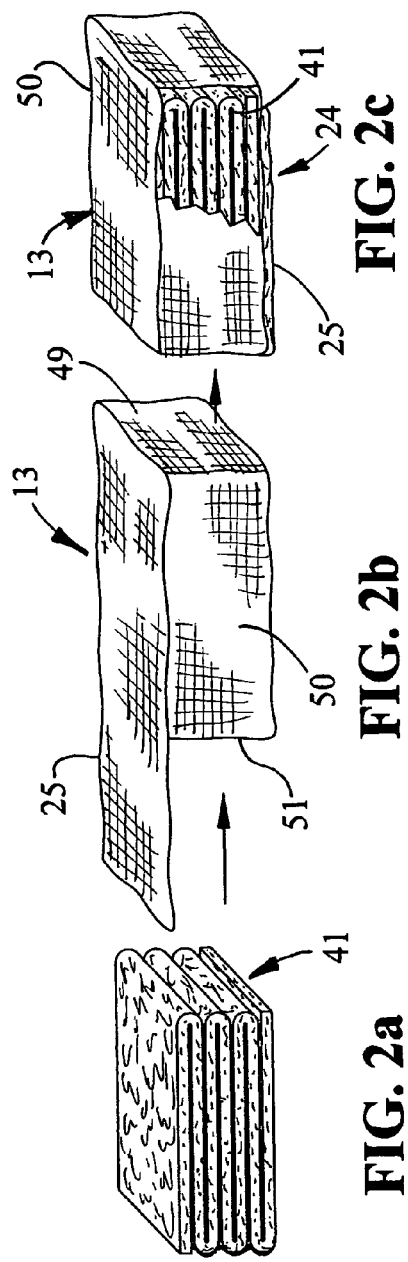
FIG. 2a
FIG. 2b
FIG. 2c

ASSEMBLY FOR TREATING FLOWING WATER

RELATED APPLICATIONS

This application is based upon Provisional Patent Application Ser. No. 61/743,548 filed Sep. 7, 2012, hereby incorporated herein by reference, and whose filing date is claimed as the filing date of the present Utility Patent Application.

BACKGROUND OF THE INVENTION

1. Field of the Invention

This invention relates to water purification, and more particularly concerns apparatus and compositions for the selective removal of trace levels of dissolved metals from rapidly flowing water.

2. Description of the Prior Art

Undesirable pollutant species such as dissolved toxic metals can occur regularly or periodically in natural bodies of water such as lakes, rivers, streams, groundwater and stormwater, and in industrial waters such as landfill leachate, municipal sewage systems and wastewater discharges. The toxic metals are primarily multivalent "heavy" metals, and can be caused to form insoluble compounds with anionic additives. The most prevalent technique for the removal of toxic heavy metals is to add to the water a sufficient amount of an anionic precipitating agent. The resultant precipitate is then allowed to settle or is removed by filtration or other methods.

Although precipitative techniques are effective, they require that the water undergoing remediation be accumulated in tanks and held there for considerable periods of time with agitation while the treatment agents are added and dispersed, causing the heavy metals to form precipitates of sufficiently large particle size to facilitate settling and/or filtration. Operations of this nature require large, expensive equipment installation and high operating expense. The high cost of such installations is justifiable only where extremely large volumes of water must be treated on a long term basis, such as in municipal waste water treatment facilities and operations involving large industrial facilities.

Another general technique for removing dissolved metal species from water involves the passage of a stream of the water undergoing remediation through a stationary bed of absorbent material. Suitable absorbent materials for such on-the-run treatments include ion exchange resins having affinity for species in either cationic or anionic form. The advantage of such technique is that the water can be treated while flowing through a confined bed of the resins, thereby avoiding the need for large holding and processing tanks. However, such beds impose an impedance to the flow of water therethrough, necessitating pumping pressures of 10 to 30 psi to achieve reasonable flow, and are adversely affected by accumulated suspended matter derived from the inflow water.

Said absorbent materials must have the ability to selectively remove the heavy metals at "trace" levels of 1-10 parts per million (ppm) amidst vastly greater concentrations of commonly abundant innocuous species. An exemplary absorbent having adequate selective affinity for trace levels of heavy metal ions is hydrogel granular material having 30% to 70% by weight of water, as disclosed in U.S. Pat. Nos. 3,715,339 and 7,041,222. However, such hydrogel granules have irregular shapes, causing beds of the granules to produce very high impedance to the flow of water. In an effort to overcome the high impedance to flow, said hydrogel polymers have been deposited upon pieces of porous sponge, as disclosed in U.S. Pat. No. 5,064,540. However, when the sponge pieces are employed as a stationary bed, a long bed length is needed for efficient removal of dissolved ionic species. Another shortcoming of the sponge pieces is that they cannot be blended with granular absorbent materials.

The most prevalent need for water treatments at fast flow rates is in stormwater catch basins which receive a rapid, gravity induced flow of water, and treat the water with minimal flow impedance within a very confined space.

It is accordingly an object of the present invention to provide means for selectively removing trace levels of dissolved metals from fast flowing water.

It is another object of this invention to provide means as in the foregoing object which occupies relatively little space.

It is a further object of the present invention to provide apparatus which will accommodate granular absorbent materials.

It is yet another object of this invention to provide apparatus of the aforesaid nature which is relatively unaffected by suspended matter within the water undergoing treatment.

It is a still further object of the present invention to provide apparatus of the aforesaid nature which is inexpensive to produce and maintain.

These objects and other objects and advantages of the invention will be apparent from the following description.

SUMMARY OF THE INVENTION

The above and other beneficial objects and advantages are accomplished in accordance with the present invention by a water treating assembly comprising:

1) a stack of multiple layers of fibrous batting material containing entrapped granules capable of selectively absorbing dissolved species from water, said stack having a rectangular foot print area,
2) a fabric pouch which snugly envelopes said stack to form a shape-retaining package, said fabric having an effective pore size to retain said granules, and
3) a cage comprised of substantially flat porous upper and lower panels of rectangular perimeter disposed in parallel relationship, and a substantially non-porous sidewall structure comprised of four straight portions of uniform height extending orthogonally between said perimeters to define an interior region having a lateral area configuration which matches the footprint of said stack, and a thickness, defined by the distance between said panels, equal to between 50% and 95% of the height of said stack, whereby said cage compressively confines said package containing said stack. At least one panel is moveable to permit access to said interior region. The terms "upper" and "lower" are employed for ease of description whereas in reality, the cage can be inverted with equal results.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is an enlarged perspective schematic view of a batting containing entrapped granules.

FIG. 2a is a perspective side and top view of an accordion folded stack of batting of FIG. 1.

FIG. 2b is a perspective view of a fabric pouch in its open state.

FIG. 2c is a perspective view, partly in section, showing a stack of batting of FIG. 2a packaged within the pouch of FIG. 2b.

DESCRIPTION OF THE PREFERRED EMBODIMENT

Figure 3:
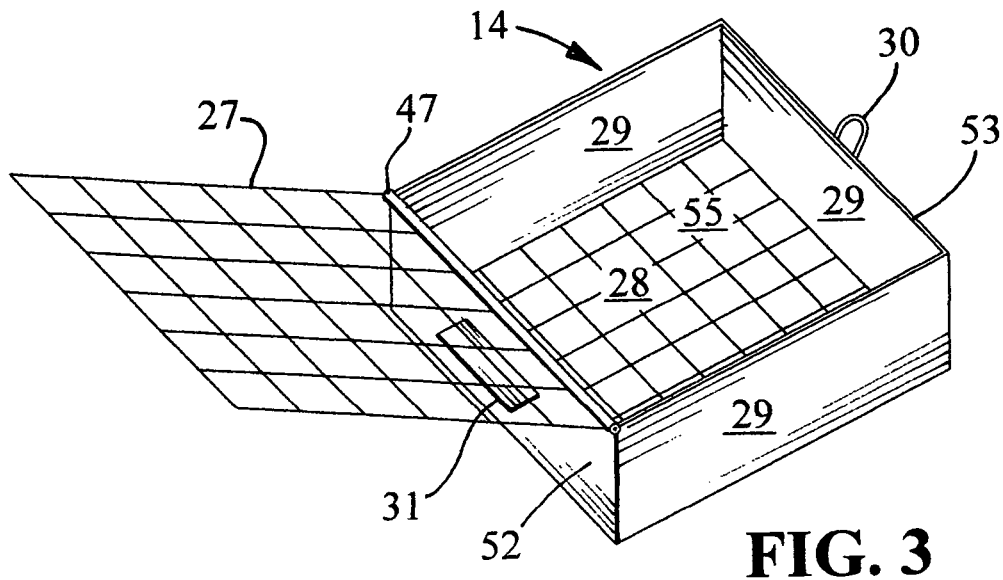
FIG. 3 is a top perspective view of a cage in its open state.
Figure 4:
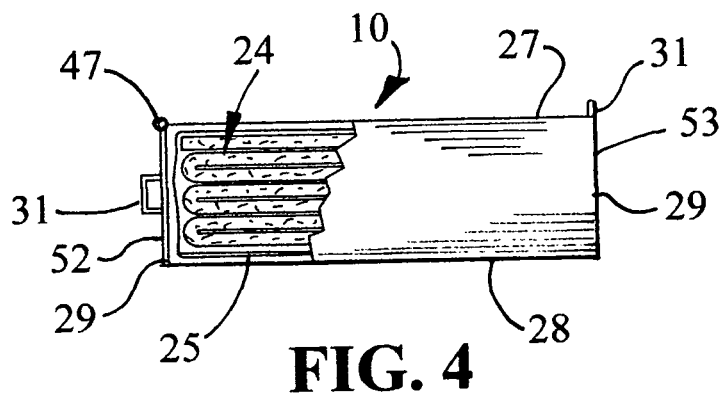
FIG. 4 is a side view with portions broken away showing the water treatment assembly of this invention, namely the package of FIG. 2c confined within the cage of FIG. 3.

Referring now to FIGS. 1-4, an embodiment of the water treating assembly 10 of the present invention is shown comprised of a fibrous batting material 40 containing entrapped granules 45 capable of selectively absorbing dissolved species from water. Said batting material is preferably in the form of a strip of uniform width and thickness which is accordion-folded to form a stack 41. A pouch 13 envelopes said stack to form a package 24. Said package is removably confined within cage 14, forming an assembly 10 which may be removably associated with the downstream port 15 of a water-handling facility such as stormwater receptacle 35.

The batting materials are preferably selected from amongst those commonly available as padding layers for furniture. The batting is comprised of fibers 42 which are interbonded at contact sites 43 so as to form a shape-retaining structure having a network of communicating interstitial spaces 44. The manner of interconnection may involve controlled physical entanglement, as may be produced by needle-punching operations, or bonding agents that interact with the fibers at their intercontacting sites 43 without filling the spaces between the fibers.

For the purposes of the present invention, the fibers are preferably interconnected by bonding agents. The preferred fibers are synthetic fibers, particularly polyester, and the polyester fiber is preferably in a continuous form, as opposed to staple fiber lengths. The thickness of the batting is preferably between about ¼ inch and ¾ inch. Battings of such preferred characteristics will have a basis weight between about 3 and 8 ounces/square yard. Preferred batting materials for achieving the objectives of the present invention have a compressive modulus between 0.5 and 0.9 grams/square centimeter, said compressive modulus being defined as the amount of force required to produce a reversible 50% reduction in thickness of a layer of said batting.

Granules 45 of irregular shape are entrapped within the spaces 44. Said granules are incorporated into the batting preferably by forming an aqueous slurry of the granules, shuffling the batting within said slurry, and then lifting the batting vertically from the slurry. Such manner of forming the aforesaid granule-confining batting has been found superior to the method described in related U.S. Pat. No. 8,263,229 which suggests that the granules be generated in-situ. The generation of the granules in-situ has been found to be a costly operation. Also, it allows little control over the sizes of the particles, thereby producing treated battings having very fine sized granules that would not be retained by the batting.

The weight of granules (on a dry weight basis) thereby entered into the batting will range from about 0.6 to 2.0 times the weight of the batting. The granules preferably have a particle size between 20 and 80 mesh (U.S. Sieve Series) Preferred granules are capable of selectively absorbing heavy metal species from water, and contain a 50% to 70% water content when immersed in water. Suitable granules may be produced from condensation-type polymers by methods described in U.S. Pat. No. 6,521,340 which is incorporated herein by reference. Preferred condensation polymers are produced by the thermal treatment of an aqueous solution of polyethyleneimine and nitrilotriacetic acid. Other granular absorbents may be incorporated into the batting, particularly zeolites and activated carbon capable of selectively absorbing dissolved organic species.

The accordion-folded stack 41 is preferably comprised of 5 to 12 layers of batting. Said stack is inserted into pouch 13 having a closed bottom 49, parallel straight side extremities 50 and open top extremity 51. The pouch is preferably fabricated of continuous synthetic fiber in a woven or knitted construction capable of reversible stretching in the lateral direction between side extremities 50. The effective mesh size opening of the fabric is between 70 and 100 (U.S. Sieve Series). Pouch 13 preferably has a flap 25 which closes the top extremity, and folds onto the lower side of package 24.

Cage 14 employs flat upper and lower porous panels 27 and 28, respectively, of substantially matching four-sided rectangular perimeter and arranged to lie in parallel relationship. Suitable panels may, for example, be woven wire mesh wherein the mesh openings are between ¼" and ⅝", and the wire diameters are 0.05" to 0.09". Such woven wire mesh material is available in stainless steel from the McNichols Company of Tampa, Fla. A non-porous sidewall structure comprised of four straight portions 29 of uniform height extends orthogonally upward from the perimeter of lower panel 28 to define an interior region 55. One sidewall portion is designated top portion 52, and the opposite sidewall portion is designated bottom portion 53. The function of the non-porous sidewalls is to prevent any of the water that enters the cage from escaping before passing through all the successive layers of the batting. Top portion 52 in the exemplified embodiment is provided with pivot means 47 to enable movement between open and closed states of the cage. Latching means 30 are preferably associated with bottom sidewall portion 53. Retrieval means in the form of loop 31 is attached to top sidewall portion 52 to facilitate upward lifting of the cage out of a subsurface water-treating facility. In other embodiments, panel 27 may have alternative movement modalities for permitting access to interior region 55.

Cage 14 has an interior lateral area configuration, extending between said sidewall portions, which matches the footprint configuration of stack 41. Such arrangement prevents the by-pass of water around the edges of package 24. The thickness of said cage, defined by the distance between upper and lower panels in parallel disposition, or the height of said sidewall portions, is 50% to 90% of the height of said stack, thereby enabling the cage to compressively confine package 24, said compression being between the planar top and bottom layers of said stack. Such compression, in the range of 10% to 50% is vital to the securement of the granules. The height of said sidewall portions is preferably between 1" and 3". Cage 14 is preferably of square contour, measuring between 8" and 24" per side.

Figure 5:
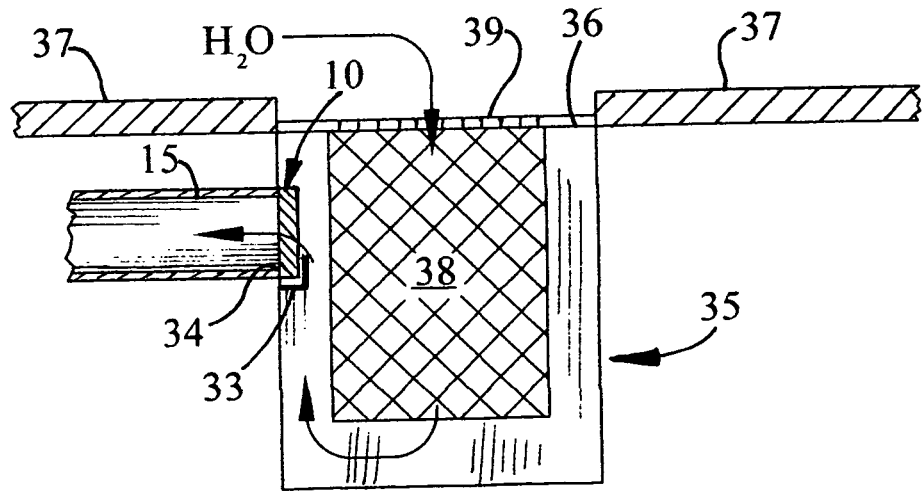
FIG. 5 is a sectional side view showing a stormwater catch basin equipped with a vertically mounted water treatment assembly of FIG. 4.

FIG. 5 illustrates the water treatment assembly 10 held vertically by supporting means in the form of bracket 33 to occlude the exit portal 34 of a stormwater catchment installation 35. Said catchment installation is installed at ground level 36 adjacent a curb 37, and contains a filtration unit 38 for removal of suspended solids positioned below a street-level grate 39. The flow of water, as shown by the arrowed lines, is downward through filtration unit 38, then upward and out of said exit portal. Because of its location downstream from unit 38, the water treatment assembly performs a polishing function in removing dissolved species that survived filtration unit 38. If the upstream face of assembly 10 becomes clogged with captured solid debris, the assembly can be reversed within bracket 33, thereby extending its service, life. When the stack saturates with absorbed species, it is removed and discarded. The pouch can be laundered and re-used.

In a preferred embodiment, the assembly of this invention is employed with water treatment installations wherein exit portal 34 has a rectangular cross-sectional contour dimensioned slightly larger than cage 14. In such installations, the cage is supported in a hanging manner by bracket means that engage the uppermost portion of cage 14 and permit controlled swinging motion in a vertical path. This permits the lowermost portion of the cage to enter the exit portal. The effect of such arrangement is to allow unimpeded flow of water through the exit portal to prevent total malfunction of the installation in the event of extremely high water flow, or blockage of the cage by accumulated sediment.

A further understanding of my invention will be had from a consideration of the following example which illustrates certain preferred embodiments. It is to be understood that the instant invention is not to be construed as being limited by said example or by the details therein.

Example 1

An aqueous solution is prepared containing equal parts by weight of polyethyleneimine (molecular weight 1800), and nitrilotriacetic acid. The solution is placed in a stainless steel tray, providing a solution level of ⅝", and the tray is placed in an oven at 350° F. Initially, the water evaporates, producing a rigid bubbled mass. Heating is maintained for one hour following formation of the bubbled mass.

The tray is removed from the oven, and water is added. The bubbled mass disintegrates by way of decrepitation, forming a granular product. The granular product is wet sieved to obtain a fraction of 20×80 mesh (U.S. Sieve Series). When blotted dry, the granules contain 56% water. Microscopic examination of the granules reveals irregular jagged contours.

A piece of resin bonded polyester batting of ⅜" thickness is selected (Product X-45, Fairfield Processing Corp, Danbury, Conn.). A strip having a width of 8" and length of 60" is cut from the batting. The batting strip is immersed into a vigorously agitated aqueous dispersion containing the aforesaid 20×80 mesh granules, then vertically removed from the dispersion and formed into a seven layer accordion-stack of 8" square footprint. The stack is inserted into a close-fitting fabric pouch having lateral stretch characteristics and an 80 mesh porosity rating (Hancock Fabrics, lingerie fabric #602185), thereby forming a wrinkle-free package.

A cage is provided having upper and lower rectangular panels of rigid woven stainless steel having ½" openings (McNichols, Tampa, Fla.). Four sidewall portions in a square array span the panels to form a cage having an interior region having a lateral area of 8"×8" and a height of 1.25".

The package is inserted into the cage in a manner such that the four sides of the package are in abutment with the side wall portions of the cage. The upper panel of the cage is caused to pivotably compact the stack by 21%. To test the resultant assembly for its ability to rapidly and selectively absorb trace levels of ionic metals at low impedance to flow, an aqueous solution containing 10 ppm (parts per million) $Cu^{++}$ and 200 ppm $Na^+$ was controllably run by gravity flow through the assembly at a temperature of 75° F. It was found that, at a contact time within the assembly of only 3 seconds, 93% of the copper was removed. The calculated impedance to flow, extrapolated to a flow rate of 10 gallons per minute per square foot of entrance surface (gpm/sq. ft.), and a large depth of absorbent media is about 0.6 psi/ft of bed height at 10 gpm/sq. ft. Such low impedance is lower than typical impedances for beds of spherical ion exchange resins, thereby making the assembly of this invention eminently suited for use in gravity flow applications such as stormwater and industrial wastewater.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A shape-retaining package comprising:
a stack of layers formed by accordion folding a continuous strip of a batting, wherein each said layer is generally flat and includes major opposed surfaces that define a rectangular perimeter, the stack being in the shape of a parallelepiped with an upper major surface of an uppermost layer defining a top of the stack and a lower major surface of a lowermost layer forming a bottom of the stack, wherein said batting is formed of randomly laid continuous polyester fibers, wherein the fibers are joined at contact sites by a bonding agent to form interstitial spaces, and wherein the batting has a compressive modulus of 0.5 to 0.9 grams per square centimeter, whereby the stack is capable of being compressed to produce a reduction in height as measured from the bottom of the stack to the top of the stack of between 10% to 50%;
a plurality of irregularly shaped granules of a polymer, wherein the polymer is adapted to selectively absorb heavy metal ions dissolved in water, and wherein the polymer granules are trapped within the interstitial spaces of said batting; and
a porous fabric pouch, wherein the stack is located within and snugly enveloped by the fabric pouch to permit the stack to be compressed to permit said reduction in height when positioned in a cage.

2. The package of claim 1 wherein said granules have a mesh size between 20 and 80 (U.S. Sieve Series).

3. The package of claim 1 wherein said polymer is a condensation polymer produced by the reaction of polyethyleneimine with nitrilotriacetic acid.

4. The package of claim 1 wherein a dry weight of said granules is between 0.6 and 2.0 times a weight of the polyester fiber content of said batting.

5. The package of claim 1 wherein said strip of batting has a thickness between ¼ and ¾ inch.

6. The package of claim 1 wherein said pouch has an open extremity having a flap adapted to close said open extremity.

7. The package of claim 1 wherein said fabric of said pouch has an effective pore size of between 70 and 100 mesh (U.S. Sieve Series) to retain the granules within the pouch.

8. An assembly for the removal of dissolved ionic species from a fast-moving flow of water comprising at least one package of claim 1 compressively inserted into a cage having porous upper and lower panels joined by an impermeable rectangular sidewall.

9. The assembly of claim 8 wherein one of said panels is pivoted in a manner to permit entrance and egress of said package.

10. The assembly of claim 8 wherein the amount of compressive force for inserting said package into said cage is such as to diminish the height of said stack by 10% to 50%.

11. The assembly of claim 8 wherein said fast-moving flow of water is stormwater.

\* \* \* \* \*